United States Patent
Alexander et al.

(10) Patent No.: US 11,061,679 B2
(45) Date of Patent: Jul. 13, 2021

(54) DOUBLE-LOAD INSTRUCTION USING A FIXED STRIDE AND A VARIABLE STRIDE FOR UPDATING ADDRESSES BETWEEN SUCCESSIVE INSTRUCTIONS

(71) Applicant: Graphcore Limited, Bristol (GB)

(72) Inventors: Alan Graham Alexander, Wotton-Under-Edge (GB); Simon Christian Knowles, Corston (GB); Mrudula Chidambar Gore, Bath (GB)

(73) Assignee: Graphcore Limited, Bristol (GB)

( * ) Notice: Subject to any disclaimer, the term of this patent is extended or adjusted under 35 U.S.C. 154(b) by 0 days.

(21) Appl. No.: 16/389,682

(22) Filed: Apr. 19, 2019

(65) Prior Publication Data

US 2020/0233670 A1    Jul. 23, 2020

(30) Foreign Application Priority Data

Jan. 22, 2019   (GB) .................................... 1900848

(51) Int. Cl.
*G06F 9/345*    (2018.01)
*G06F 9/30*    (2018.01)
(Continued)

(52) U.S. Cl.
CPC ........ *G06F 9/3455* (2013.01); *G06F 9/30043* (2013.01); *G06F 9/30141* (2013.01); *G06F 9/30145* (2013.01)

(58) Field of Classification Search
CPC ............... G06F 9/3455; G06F 9/30043; G06F 9/30141; G06F 9/30145; G06N 3/04
(Continued)

(56) References Cited

U.S. PATENT DOCUMENTS 7,487,296 B1 *   2/2009   Iacobovici .......... G06F 12/0862
                                                           711/137
10,108,538 B1   10/2018   Temam et al.
(Continued)

FOREIGN PATENT DOCUMENTS

EP       1535190 B1    6/2005
JP    2002517038 A    6/2002
(Continued)

OTHER PUBLICATIONS

Gather-scatter (vector addressing). In: Wikipedia, the free encyclopedia. Processing status: Feb. 17, 2017. URL: https://en.wikipedia.org/w/index.php?title=Gatherscatter_(vector_addressing)&oldid=765888876 (retrieved Feb. 24, 2020).
(Continued)

*Primary Examiner* — Shawn Doman
(74) *Attorney, Agent, or Firm* — Haynes and Boone, LLP

(57) ABSTRACT

A processor comprising an execution unit, memory and one or more register files. The execution unit is configured to execute instances of machine code instructions from an instruction set. The types of instruction defined in the instruction set include a double-load instruction for loading from the memory to at least one of the one or more register files. The execution unit is configured so as, when the load instruction is executed, to perform a first load operation strided by a fixed stride, and a second load operation strided by a variable stride, the variable stride being specified in a variable stride register in one of the one or more register files.

20 Claims, 3 Drawing Sheets

(51) Int. Cl.
*G06N 3/063* (2006.01)
*G06N 3/08* (2006.01)
*G06F 9/38* (2018.01)

(58) Field of Classification Search
USPC .................................................. 712/208, 225
See application file for complete search history.

(56) References Cited

U.S. PATENT DOCUMENTS

| | | | |
|---|---|---|---|
| 2005/0055535 A1 | 3/2005 | Moyer | |
| 2009/0249024 A1* | 10/2009 | Jones | ............... G06F 9/345 711/219 |
| 2010/0318979 A1* | 12/2010 | Greyzck | ............... G06F 9/3455 717/160 |
| 2013/0117546 A1 | 5/2013 | Jacobi | |
| 2014/0136811 A1 | 5/2014 | Fleischer | |
| 2014/0189287 A1* | 7/2014 | Plotnikov | ........... G06F 9/30145 712/3 |
| 2016/0188476 A1* | 6/2016 | Yu | ............... G06F 9/30047 711/137 |
| 2016/0314075 A1* | 10/2016 | Moudgill | ............ G06F 9/30043 |
| 2017/0031865 A1 | 2/2017 | Eyole | |
| 2017/0192782 A1* | 7/2017 | Valentine | ............. G06F 9/3016 |
| 2019/0332924 A1* | 10/2019 | Cassidy | ............... G06N 3/0454 |
| 2020/0097411 A1* | 3/2020 | Pusdesris | .................. G06F 5/06 |

FOREIGN PATENT DOCUMENTS

| | | |
|---|---|---|
| JP | 2013519955 A | 5/2013 |
| JP | 2018523238 A | 8/2018 |
| JP | 2020109604 A | 7/2020 |

OTHER PUBLICATIONS

Complex instruction set computer. In: Wikipedia, the free encyclopedia. Processing status: May 3, 2019. URL: https://en.wikipedia.org/w/index.php?title=Complex_instruction_set_computer&oldid=895329390 (retrieved Feb. 24, 2020).
Addressing mode. In: Wikipedia, the free encyclopedia. Processing status: Mar. 29, 2019. URL: https://en.wikipedia.org/w/index.php?title=Addressing_mode&oldid=888764448, (retrieved Feb. 24, 2020).
Office Action dated Mar. 2, 2020 for German Patent Application No. 10-2019-112-186.8.
Combined Search and Examination Report for United Kingdom Patent Application No. GB1900848.1 dated Aug. 29, 2019. 5 pages.
Office Action dated Jun. 9, 2020 for Canadian Patent Application No. 3,040,894. 4 pages.
Office Action of Aug. 20, 2020 for Japanese Patent Application No. 2019-113331. 6 pages.
Search Report and Written Opinion dated Apr. 13, 2021 for French Application No. FR1906116.

* cited by examiner

DOUBLE-LOAD INSTRUCTION USING A FIXED STRIDE AND A VARIABLE STRIDE FOR UPDATING ADDRESSES BETWEEN SUCCESSIVE INSTRUCTIONS

CROSS-REFERENCE TO RELATED APPLICATIONS

This application claims the priority benefit under 35 U.S.C. § 119 of United Kingdom Patent Application No. 1900848.1, filed Jan. 22, 2019, the entire contents of which are incorporated herein by reference.

TECHNICAL FIELD

The present disclosure relates to a load instruction that performs two load operations in response to a single opcode.

BACKGROUND

There has been increasing interest in developing processors designed for specific applications, such as graphics processing units (GPUs) and digital signal processors (DSPs). Another type application-specific processor which has gained interest recently is one dedicated to machine intelligence applications, dubbed by the applicant as an "IPU" (intelligence processing unit). These may be employed for example as accelerator processors arranged to perform work allocated by a host, such as to train or assist in training a knowledge model such as a neural network, or to perform or assist in performing predictions or inferences based on such a model.

A machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The instruction set of a processor refers to the set of fundamental types of machine code instruction that the processor's execution unit is configured to execute. Each machine code instruction comprises an operand and zero or more operand fields for taking a respective zero or more operands. Each type of machine code instruction in the instruction set is characterized by a different respective opcode which triggers different logic in the execution unit for performing a different respective type of operation when executed.

One way to tailor the design of a processor to be suited to a particular application, such as machine intelligence, is to provide one or more dedicated types of instruction in the processor's instruction set for performing types of operation that tend to occur often in the application in question. E.g. if the application often requires a particular type of arithmetic function to be performed (e.g. a matrix multiplication), that would otherwise have to be built up from a sequence of simpler machine code instructions (e.g. adds and scalar multiplications), then the new design for the application-specific processor could include an instruction in the instruction set which can instead perform this arithmetic function in response to the single opcode and associated operands of a single instance of a single machine code instruction.

SUMMARY

One issue to deal with when processing data in applications such as machine intelligence is sparsity. That is, in some data sets, there may only be a relatively small number of the data values that contain useful or relevant information. To efficiently process such data, it would be desirable to only load those values from memory. However the pattern of relevant data is effectively random. Which data values are to be loaded is for the program to decide. To do this efficiently, a programmable stride may be included as part of the implicit functionality of a load instruction. That is, with each load instruction, the instruction also applies a stride value to the load address (typically after the load of the current value, i.e. so the address is post-incremented for the next load instruction). This stride value can be made programmable, by being set in a programmable register of the processor.

On the other hand, while some data may be sparse, another set of values being used alongside the sparse data in the same application may be systematic. That is, the program requires to load every value from a range of contiguous addresses in memory (or at least the values from regular intervals in the memory address space). An example of this occurs in a neural network, where the program needs to load both weights of the neural network (systematic) and data to be operated on by the neural network (typically sparse).

In order to efficiently process such data, it is recognized herein that it would be desirable to provide a type of load instruction with a "semi sparse" addressing functionality. I.e. the load instruction performs two load instructions in a single machine code instruction, each with different behaviour. To accommodate a first, systematic set values such as weights, the first load increments the first load address systematically by a fixed stride with each instance of the instruction executed; but to accommodate a sparse set of data being processed alongside the first, the second load operation increments the second load address by a programmable stride value with each instance of the instruction.

Hence according to one aspect disclosed herein, there is a processor comprising an execution unit, memory and one or more register files. The execution unit is configured to execute instances of machine code instructions from an instruction set. The types of instruction defined in the instruction set include a double-load instruction for loading from the memory to at least one of the one or more register files. The execution unit is configured so as, when the load instruction is executed, to perform a first load operation strided by a fixed stride, and a second load operation strided by a variable stride, the variable stride being specified in a variable stride register in one of the one or more register files.

The execution unit comprises a load-store unit configured to perform the load operations. The execution unit also comprises a logic unit which may comprise an integer arithmetic unit and/or a floating point arithmetic unit. Depending on embodiment, the strides may be applied by the load-store unit or the integer arithmetic unit.

In embodiments, the load-store unit may be configured to apply the fixed stride after the first load, and the variable stride after the second load. I.e. the addresses are post-incremented with each instance of the double-load instruction that is executed. Alternatively however, in other implementations, it is not excluded that the stride could pre-increment the address with each instance of the double-load instruction.

In embodiments, the double-load instruction may take operands specifying a first source address in the memory for the first load, a first destination in one of the one or more register files for the first load, a second source address in the memory for the second load, and second destination in one of the one or more register files for the second load, the first source address being specified by a first offset in an offset register in one of the one or more register files, and the second source being specified by a second offset in an offset register in one of the one or more register files. In this case the execution unit is configured so as, when the load instruction is executed, to perform the first load operation by loading a first value from the first source address to the first destination, and apply the fixed stride to the first offset, and to perform the second load operation by loading a second value from the second source address to the second destination, and apply the variable stride to the second offset.

Preferably the offset is an offset relative to a non-zero base address. Alternatively however, in other implementations, it is not excluded that it could be an offset from zero, i.e. an absolute address within the relevant address space.

Depending on embodiment, the first and second destinations could be first and second registers in one of the one or more register files or different ones of the registers, or could be first and second fields in the same destination register in one of the one or more register files. E.g. in embodiments the register file used as the destination for the loads has a 32-bit or 64-bit word architecture, and each of the first and second values is a 16-bit value (e.g. a 16 bit floating point value), the first being loaded into a first field of one of the 32-bit or 64-bit registers and the second value being loaded into a second field of the same register.

In embodiments, the first and second offsets may be held in different fields of a same offset register in one of the one or more register files, and the execution unit is configured to apply the strides by adding the fixed and variable strides to the first and second offsets respectively then writing back to the offset register. Alternatively in other implementations, it is not excluded that the first and second offsets could be held in respective first and second offset registers.

In embodiments, said offset register may be specified by an operand of the double-load instruction. Alternatively in other implementations the offset register could be implicit; i.e. does not need to be specified by an operand, e.g. instead being fixed or set as a parameter by one or more other, earlier instructions.

In embodiments, the execution unit may be configured to determine said first source address by adding the first offset to a non-zero base address, and to determine said second destination address by adding the second offset to a non-zero base address. E.g. in embodiments the base address is a 21-bit value held in a 32-bit register, and the offset values are each 16-bit values added to the least significant bits of the 32-but base address value.

In embodiments, the same base address may be used for the first and second source addresses. Or in other implementations, it is not excluded that different respective base addresses could be used.

In embodiments, the base address may be specified in a base address register in one of the one or more register files. In embodiments, the double-load instruction may take an operand specifying the base address. In alternative implementations, it is not excluded that e.g. the base address could be zero, or could be non-zero but a fixed, implicit value.

In embodiments, the double-load instruction may take an operand specifying the variable stride register. Alternatively, in other implementations, the variable stride register could be implicit.

In embodiments, the variable stride register may be arranged to hold a plurality of stride values in a plurality of respective fields of the variable stride register, and the execution unit is configured to perform said varying of the variable stride by using a different one of the stride values with each successive instance of the double-load instruction executed by the execution unit. E.g. in embodiments, the fields are 4-bits each, each thus allowing any of sixteen different possible stride values to be specified. In embodiments the stride register is 32-bits wide, thus allowing 8 stride values to be held.

In embodiments, the execution unit may be configured to perform said use of different values by shifting the contents of the variable stride register by one field's worth of bits with each successive instance of the double-load instruction.

In embodiments, the execution unit may always uses the least significant field for the (e.g. four least significant bits) and the shift is a right shift. E.g. where the fields are 4-bits each, the right shift comprises shifting right by 4 bits.

However, in other alternative embodiments, other means of varying the stride could be used. E.g. the execution unit may be configured to use different fields of the stride register, and/or different successive stride registers, with each successive instance of the double-load instruction.

The execution unit may be operable to load the stride values into the variable stride register, to load the first and second offsets into the offset register, and/or to load the base address into the base address register, by executing earlier instructions.

In embodiments, the processor may be programmed to execute a program comprising at least part of a neural network, the program comprising a plurality of instances of the double-load instruction; wherein in each instance, the first load operation is used to load weights of neural network, and the second load operation is used to load data operated upon by the neural network.

According to another aspect disclosed herein, there is provided a computer program embodied on a computer-readable storage medium and comprising code configured to be executed by the processor of any embodiment disclosed herein, the code comprising a plurality of instances of the double-load instruction.

According to another aspect disclosed herein, there is provided a method of operating a processor comprising an execution unit, memory and one or more register files, the execution unit being configured to execute instances of machine code instructions from an instruction set, wherein: the types of instruction defined in the instruction set include a double-load instruction for loading from the memory to at least one of the one or more register files; and the method comprises executing a plurality of instances of the double-load instruction through the execution unit, the execution unit being configured to execute each of said instances of the double-load instruction by: performing a first load operation strided by a fixed stride with each successive instance of the double-load instruction, and a second load operation strided by a variable stride with each successive instance of the double-load instruction, the variable stride being specified in a variable stride register in one of the one or more register files.

In embodiments, the method may further comprise operations in accordance with any of the processor features disclosed herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
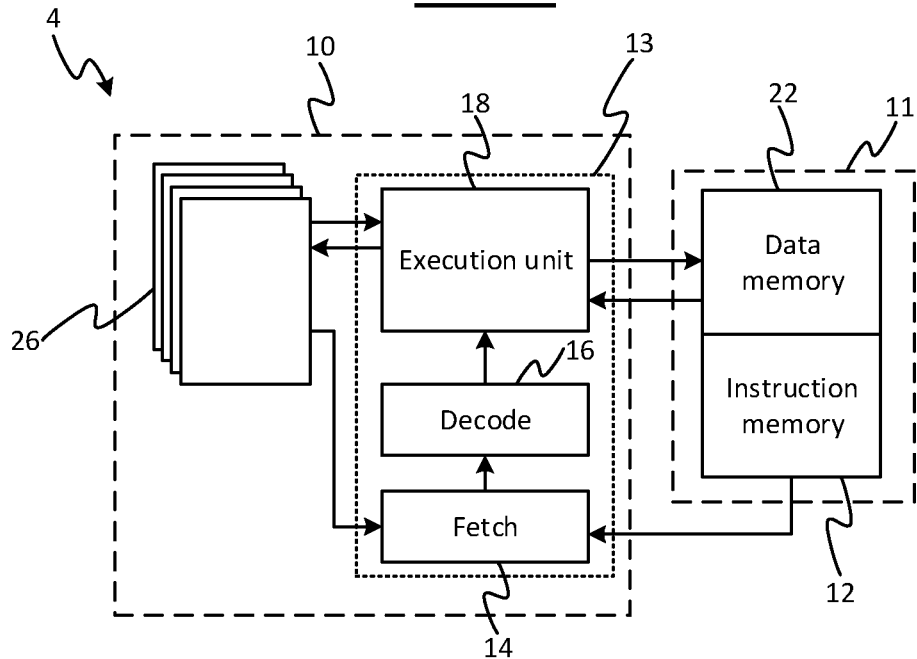
FIG. 1 is a schematic block diagram of a processor.

FIG. 1 illustrates an example of a processor comprising at least one processing module 4 in accordance with embodiments of the present disclosure. In embodiments, the processor may comprise a plurality of such processing modules 4, or "tiles", implemented on the same chip (i.e. die) and connected together via an interconnect fabric enabling them to communicate with one another.

The processing module 4 comprises a processing unit 10, one or more register files 26, and a local memory 11 (i.e. on the same tile in the case of a multi-tile array, or same chip in the case of a single-processor chip). The memory 11 comprises an instruction memory 12 and a data memory 22 (which may be implemented in different addressable memory units or different regions of the same addressable memory unit). The instruction memory 12 stores a program comprising machine code instructions to be executed by the processing unit 10. The data memory 22 stores data to be operated on by the executed code and data output by the executed code (e.g. as a result of such operations). Registers in a register file 26 are distinct from general memory in that register addresses are fixed as bits in instruction words, whereas memory addresses can be computed by executing instructions.

The execution pipeline 13 comprises a fetch stage 14, a decode stage 16, and an execution stage 18 comprising an execution unit which may perform arithmetic and other logical operations, address calculations, load and store operations, and other operations, as defined by the instruction set architecture. Note that an instruction as referred to herein means a machine code instruction, i.e. an instance of one of the fundamental instructions of the processor's instruction set, consisting of a single opcode and zero or more operands.

The fetch stage 14 fetches instructions of the program from the memory 12 in turn, and passes them to the decode stage 16 to be decoded. The decode stage 16 then passes an indication of the decoded instruction to the execution unit 18 along with the decoded register addresses of any operand registers specified in the instruction (i.e. the address in the register file(s) 26), in order for the instruction to be executed. The execution unit 18 has access to the operand and control state registers in the register file(s) 26, which it may use in executing the instruction based on the decoded register addresses. In embodiments the register files 26 may comprise a first or main register file (MRF) for storing integers including at least memory addresses, and a second or auxiliary register file (ARF) for storing floating point values, e.g. f16s and/or f32s.

When the execution unit 18 executes certain types of instructions, it may use one or more registers in at least one of the one or more of the register files 26, depending on the type of instruction. For instance the instruction set of the processor will comprise at least one type of load instruction, and in embodiments a plurality of different types of load instruction. A load instruction takes at least one operand for specifying a source address in memory 22, and at least one operand for specifying a destination register or registers in at least one register file 26. When executed it loads a value from the source address in memory 22 into the specified register(s) in the register file(s) 26 (e.g. the ARF). Some types of load instruction specify the source address via a pointer held in another register in one of the register files 26 (e.g. the MRF), which points to the source address in memory 22. In this case the source operand of the load specifies the source memory address vicariously, by specifying the register in the MRF from which to take the source address. The pointers may be pre-loaded into the MRF by other, previously executed instruction instances. E.g. in some embodiments this could be by instances of another, more "basic" type of load instruction which takes an immediate source address operand. Or in other embodiments, rather than the load taking an immediate source operand, that immediate value may be formed from immediates in other instructions and stored in a register for a subsequent load instruction to then use as an address register. Note: generally, there's no need to treat the pointers any differently to any other data. The content just happens to be addresses, rather than integers or floating-point values. As such, in some embodiments the instruction set does not in fact include any load instruction that takes the complete absolute address as an immediate (but does include instructions for copying immediate values into registers).

The processor instruction set will also include a plurality of arithmetic instructions, typically including both integer arithmetic instructions and floating point arithmetic instructions. An arithmetic instruction takes one or more source operands and at least one destination operand, specifying source and destination registers in at least one of the register files 26 (e.g. the ARF). When executed, the arithmetic operation will perform its respective type of arithmetic operation on the values held in the source register(s) and place the result in the specified destination register(s). E.g. an add instruction may take two source operands and one destination operand, and will add the values found in the source registers and place the resulting sum in the destination register. Various other more complex types of arithmetic operation may also be included the instruction set, such as for performing matrix multiplications or convolutions (or parts thereof). E.g. these types of instructions may find a particular application in machine learning where it may be desired to have the program efficiently convolve a matrix of weights (a kernel) with a set of input data.

The instruction set of the processor further comprises at least one type of store instruction. A store instruction takes operands for specifying at least one source in at least one of the register files 26 (e.g. ARF) and at least one destination in the memory 22. When executed, the store instruction stores the value found in the specified source register to the specified memory address in the memory 22. Some types of store instruction specify the destination address via a pointer held in another register in one of the register files 26 (e.g. the MRF), which points to the destination address in memory 22. In this case the destination operand of the store specifies the destination memory address vicariously, by specifying the register in the MRF from which to take the destination address. Load-store instructions are also known, which perform both a store and a load in single instruction.

In embodiments the processing unit 10 may take the form of a multi-threaded processing unit, sometimes also called a barrel-threaded processing unit, which is capable of concurrently executing a plurality of temporally interleaved threads. In this case the memory 12 stores a plurality of different threads of a program, each thread comprising a respective sequence of instructions for performing a certain task or tasks. The fetch stage 12 is arranged to fetch instructions from different ones of a concurrent set of the threads in turn and interleave them through the pipeline 13. Each of the concurrent threads is allocated at least one respective register file 26, for holding the program state (i.e. context) of that respective thread separate from the other concurrent threads. Sometimes the registers of each thread are called its context registers. When a given thread is being executed, the execution unit 18 inherently uses the register file(s) 26 of the respective thread in order to instructions of that thread such as load instructions, arithmetic instructions and store instructions. In embodiments the context of each thread is provided with its own separate respective MRF and ARF, and when the execution unit 18 executes a given thread it inherently uses the respective MRF or ARF of the respective thread in accordance with the type of operand.

Figure 2:
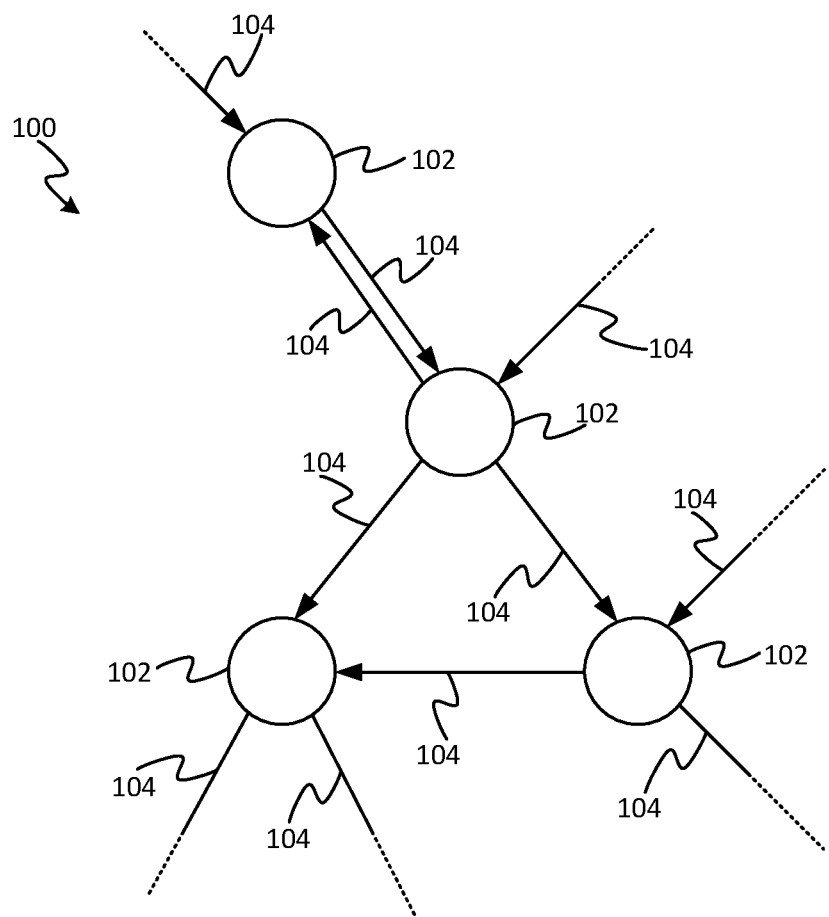
FIG. 2 is a schematic illustration of a neural network.

In one exemplary application of the disclosed processor, the program run on the processing module 4 may implement at least part of a neural network 100, the idea of which is illustrated schematically and by way of example in FIG. 2.

The neural network comprises a graph of interconnected nodes (i.e. vertices) 102 and edges (i.e. connections) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or cost, or such like. Over many trials the algorithm can gradually tune the parameters of the graph to be able to predict inputs that will result in a positive outcome. The various approaches and algorithms for learning a graph will be known to a person skilled in the art of machine learning.

In embodiments where the processing unit 10 is a multi-threaded processing module, each thread may be used to implement a different respective node 102 of a neural network. And/or, in embodiments where the processor comprises a plurality of tiles, each being an instance of the described processing module 4, then each tile 4 may be used to implement a respective part of the neural network comprising a subset of one or more of the nodes 102.

Communications between threads and/or tiles, accordingly, represent edges 104 between nodes 102 in the neural network. The program as a whole, run across the multiple threads and/or tiles 4, may implement a machine intelligence algorithm comprising the neural network along with a training algorithm configured to train the neural network, and/or inference or prediction algorithm to perform inference or prediction based on the neural network.

Figure 3:
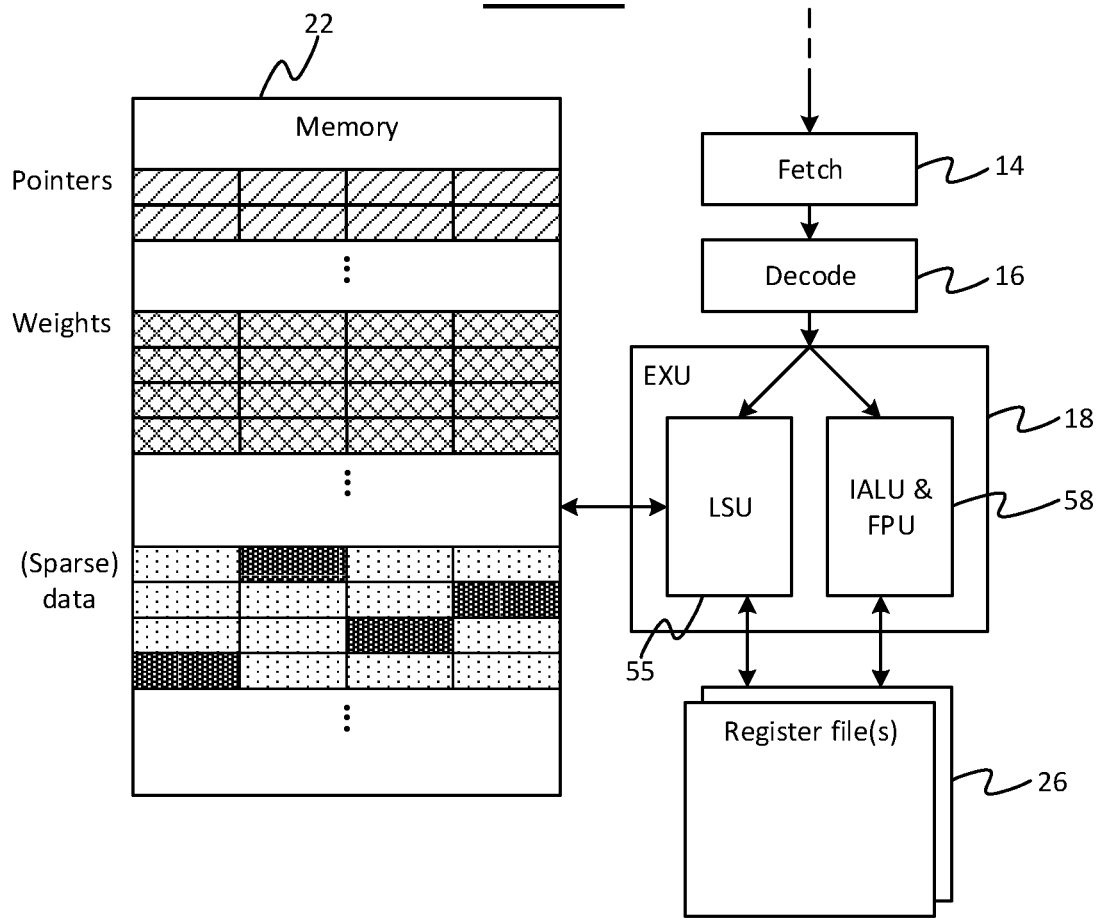
FIG. 3 is another schematic block diagram of a processor.

FIG. 3 shows more detail of the processing module 10 according to embodiments disclosed herein. As shown, the execution unit 18 comprises a load-store unit (LSU) 55 for executing load and store instructions, and a logic unit 58 for executing arithmetic instructions. The logic unit 55 may comprise an integer arithmetic logic unit (IALU) for executing integer arithmetic instructions, and/or a floating point unit (FPU) for executing floating point arithmetic instructions.

In a given application, the memory 22 may be used to store at least three types of content: a) pointers (represented schematically by diagonal hatching in the figure), b) systematic values (cross hatching), and sparse data (dotted fill). The pointers are memory addresses, or address offsets or deltas, which are to be loaded into registers in at least one of the register files 26 (e.g. the MRF), to be used by further load instructions to point to the other values/data in the memory 22 to be loaded. The pointers may be placed in the register file(s) 26 by means of previously executed instructions as mentioned previously. Once this is done, one or more further types of load instruction can perform loads from addresses defined instead by strides (deltas) or offsets relative to the address held in the register. This means the further type of load instructions can have a higher semantic density. Including a full immediate instance of a desired load address in the instruction format, as in a basic type of load instruction, takes up a lot of bits in the source operand field. So if this is not required and instead the source operand of the further type of load instruction need only specify a smaller register address containing a pointer for the load, then it can accommodate one of more additional operands supporting more functionality than just a single, basic load operation. Also, software data structures exhibit spatial locality, so the addresses tend to be very similar to one another. It's inefficient in terms of energy to keep fetching instructions (and their associated immediates) that only differ in a few bits.

An example of a strided, high semantic-density load instruction disclosed herein is the double-load instruction (also called the semi-sparse load instruction), to be discussed in more detail shortly.

The systematic values are values to be operated upon by the program which the program will require to load from systematic locations throughout a range of memory addresses in a region of the memory 22, i.e. from each contiguous address or at least regular intervals in address space. An example of this is weights in a neural network. The following description will exemplify the systematic values as being weights, but it will be appreciated this is not limiting and the teachings below can also apply to other types of systematic value. The sparse data on the other hand is data, also to be operated on by the program, which the program will only required from certain selected locations that are not spaced apart in a systematic manner (i.e. not at regular intervals). Put another way, only some of the data contains useful or relevant information. E.g. many of the data may be quantized to zero and only the non-zero data entries are required; or as another example, the program may wish to drop-out some of the values in a pseudorandom pattern. The memory locations of such items of data are in effect arbitrary, in that they follow no systematic pattern and in any given program could happen to appear anywhere amongst the data.

The program may require loading both of the systematic values and selected entries from the sparse data alongside one another, e.g. to operate on them together. For instance it may be required to reduce a systematic set of weights with only selected data from the sparse data set. E.g. in the context of a neural network, weights are typically densely packed whilst the actuations from other neurons may be sparsely packed.

It is for the program to determine which data it requires to load, depending on the application. However, in order to enable the program to efficiently work through the memory contents, it is recognized herein that it would be desirable to provide an instruction in the processor's instruction set which performs two loads in a single instruction with a "semi-sparse" load functionality. That is, one of the load operations is strided by a fixed stride with each instance of the load instruction that is executed, whilst the other load is strided by a variable stride with each instance of the load instruction. This type of load instruction may be referred to herein as the double-load or semi-sparse load instruction, or in some embodiments "ldb16b16". In embodiments its semantics are as follows.

ldb16b16    $aDst0:Dst0+1,    $mBase0,    $mOffset++, $mDelta>>

By way of representing an example implementation, "$m" refers to a register in the MRF (used for memory addresses) and "$a" refers to a register in the ARF (used for floating point values).

As represented in the above semantics, the double-load instruction takes at least one destination operand specifying first and second destinations, in at least one of the register files 26 (e.g. the ARF), for the first and second load operations respectively. In embodiments these are two separate destination registers $aDst0 and $aDst0+1 in one of the register files 26 (e.g. the ARF), e.g. adjacent registers. In embodiments, this requires a single operand to identify one of the registers (e.g. the first $aDst0) in one of the register files 26, and the location of the other is understood by the execution unit 18 as being inherent relative to that, e.g. being the preceding or next adjacent register $aDst0+1 (so-called naturally aligned registers). Alternatively, in another implementation, it is not excluded that the first and second destinations could be first and second fields in the same register (in which case only a single destination operand is needed to identify that register). Either way, in embodiments the double-load instruction loads a pair (two element vector) of 16-bit values, e.g. f16s (half precision floating point values). This may be used to load one 16-bit weight, and one 16-bit data value from the sparse data set, e.g. both f16s.

The mnemonic "ldb16b16" refers to the fact that, in embodiments, the first and second load operations performed are 16-bit broadcast loads. "Broadcast" in this context refers to replicating a scalar value such that it fully populates a vector, with each vector element being a copy of the scalar value. The 'b's in ldb16b16 indicate that the two loaded 16-bit scalar values are to be broadcast. In embodiments, the values are each duplicated to populate a 2-element vector of 16-bit elements. I.e. each of the first and second destination registers (e.g. $Dst0 and $Dst0+1) is a 32-bit wide register; the 16-bit weight loaded by the first load operation being duplicated to fill the 32-bits of the first destination register (e.g. $Dst0), and the 16-bit data value of the second load operation being duplicated to fill the second destination register (e.g. $Dst0+1). The reason for this is that, in at least one implementation, the register files 26 and ARF pipeline may operate on a minimum of 32-bits. In the case of 16-bit values, the smallest datum is a 2-element vector (f16v2). The broadcast ensures that the same input values are presented to both 16-bit half-pipelines. The duplication means that any resulting exception can only be due to the 16-bit input operands (whereas if 0 for example was presented to one of the half-pipelines, that may result in an exception not caused by the input operands).

The double-load instruction also takes one or more operands specifying first and second source addresses in the memory 22 from which to load the values loaded by the first and second load operations, respectively. In embodiments these are specified by identifying one or more registers, in at least one of the register files 26, which between them hold values for determining the first and second source address in the memory 22. To do this, in embodiments, the double-load instruction takes one source operand identifying a base address register $mBase in one of the register files 26 (e.g. the MRF), and another source operand identifying an offset register $mOffset in one of the register files 26. The base address register $mBase is arranged to hold a base memory address, i.e. base pointer (having been pre-loaded there by an earlier instance of another instruction, e.g. another type of load instruction or a constant forming instruction or some integer arithmetic to form a base address). This base address is a common base address for both the first and second load operations. The offset register $mOffset is arranged to hold a first and second address offset value for the first and second loads, respectively, in first and second respective fields of the $mOffset register, again having been placed there previously there by an earlier executed instruction. Or in alternative embodiments, depending on the offset sizes and register architecture, two separate first and second registers could be used to hold the first and second offsets (e.g. the offset operand identifying only one of these and the location of the other being inherent relative to it, e.g. an adjacent register in the same register file). Either way, the "++" in the above semantic expression refers to the fact that the offset values in the offset register(s) are automatically incremented by a stride value with each instance of the double-load instruction executed: the first by a fixed stride value, and the second by a programmable delta.

The double-load instruction further takes at least one operand specifying the stride value for the second load operation, i.e. an address delta to be applied to the second offset in the offset register $mOffset with each instance of the double-load instruction that is executed. In embodiments this only requires a single operand. In embodiments the operand specifies the delta by identifying a delta register $mDelta in one of the register files 26 (e.g. MRF), having been placed previously there by an earlier executed instruction. The delta register $mDelta is arranged to hold at least one delta value, and in embodiments a plurality of deltas in a plurality of respective fields (e.g. 4-bit fields) of the delta register. The functionality of the double-load instruction is to use a different ones of the delta values with each successive instance of the double-load instruction that is executed. In embodiments this is implemented by shifting the contents of the register right by one field's worth of bits (e.g. 4-bits) each time, and always using the least significant field (e.g. least significant 4 bits) for the current delta (i.e. stride). This is what is represented by the ">>" in the above expression.

Figure 4:
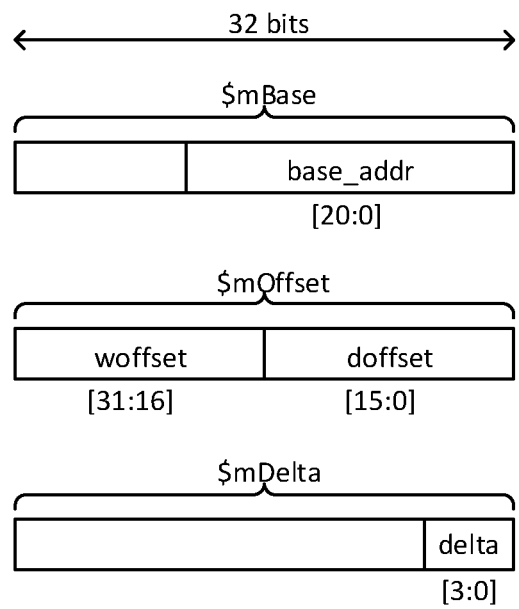
FIG. 4 is a schematic illustration of some registers in register file, and
FIG. 5 schematically illustrates the operation of a semi-spares load instruction.

As shown in FIG. 4, in embodiments the base address register $mBase (in the MRF) is 32-bits wide and the base address (base_addr) is a 21-bit pointer occupying the 21 least significant bits of the base address register. In embodiments the offset register $mOffset (in the MRF) is 32-bits wide. A first 16-bit field of the offset register $mOffset, e.g. the most-significant 16-bits $mOffset[31:16], is used to hold a 16-bit offset value (woffset) for the first load operation (for the weight); and a second 16-bit field of the offset register $mOffset, e.g. the least-significant 16-bits $mOffset[15:0], is used to hold a 16-bit offset value (doffset) for the second load operation (for the data value from the spare data). In embodiments the delta register $mDelta (in the MRF) is 32-bits wide, and each of the delta fields within it is 4-bits, giving eight fields in total for storing 8 independently settable 4-bit strides, each able to take any of different 16 possible values.

Figure 5:
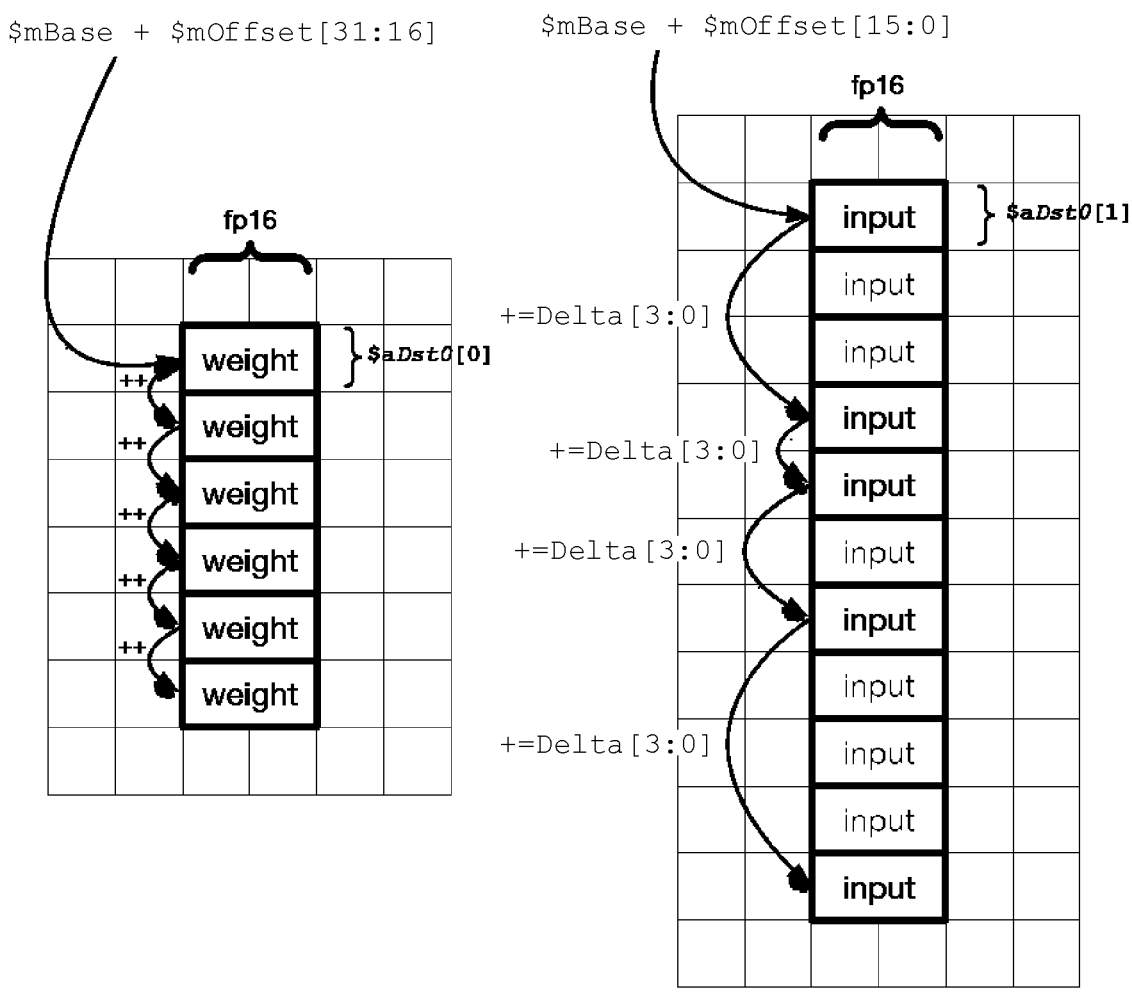

FIG. 5 shows the operation of the double-load instruction when executed by the execution unit 18 (the execution unit 18 comprising suitably configured logic to perform this functionality in response to the opcode of the double load instruction). When an instance of the double-load instruction is executed, the first load operation loads the value found in the first source address in memory 22 to the first destination register (e.g. $aDst0) in one of the register files 26 (e.g. the ARF). In embodiments, the value of first source address is the base address (base_addr) plus the first offset value. In embodiments the first source address is taken from the base address register $mBase, and the first offset (woffset) is taken from the first field of the offset register $mOffset, e.g. $mOffset[31:16]. I.e. the first load operation loads from $mBase+$mOffset[31:16], into $Dst0.

The second load operation is also performed in response to the same opcode of the same instance of the double-load instruction. The second load operation loads the value found in the second source address in memory 22 to the second destination register (e.g. $aDst0+1) in one of the register files 26 (e.g. the ARF). In embodiments, the value of second source address is the base address (base_addr) plus the second offset value. In embodiments the second source address is taken from the base address register $mBase, and the second offset (doffset) is taken from the second field of the offset register $mOffset, e.g. $mOffset[15:0]. I.e. the second load operation loads from $mBase+$mOffset[15:0], into $Dst0+1.

With each successive instance of the double-load instruction that is executed, the first source address is automatically incremented by a fixed delta, e.g. one unit (atom) of address space (e.g. one unit for the purpose of striding being 2-bytes—see below). In embodiments this is implemented by adding one unit to the value in the first field of the offset register $mOffset. Further, the second source address is automatically incremented by a programmable delta. In embodiments this is implemented by adding the programmable delta to the value in the second field of the offset register $mOffset. In embodiments, the programmable delta is taken from one of the fields of the delta register $mDelta. This delta value denotes a number of units (atoms) to add to the second offset (e.g. a number of units of 2-bytes). Further, with each successive instance of the double-load instruction that is executed, a different one of the multiple delta values in the delta register $mDelta is used. In embodiments, this is implemented by always using the least significant field (e.g. least-significant 4 bits) of the delta register $mDelta, and then shifting the contents of this register right by one field (e.g. 4 bits) with each instance of the double-load instruction. An equivalent variant would be to always use the most significant field (e.g. most significant 4 bits) and shift left with each instruction. N.B. "left" and "right" in the context of binary logic refers to the bit significance, not the physical orientation.

The two strides are applied to their respective addresses automatically, i.e. as an inherent part of executing the same, single instance of the double-load instruction, in response to the opcode of the double-load instruction. No separate machine code instructions are required to apply the strides to the offsets (though they may be required to initially load the base address, offsets and stride deltas into the base address, offset and delta registers, $mBase, $mOffset and $mDelta).

In embodiments, each of the values being loaded (i.e. the weight and data value) is a 16-bit value. Hence one unit of stride or delta for the present purposes (the atomic size) is 2 bytes. So with each instance of the double-load instruction, the first source address (for the weights) is incremented by one unit of 2-bytes, and the second source address (for the data) is incremented by a number equal to the value ("delta") in the delta register plus one, times two bytes; i.e. delta+1 lots of units of 2-bytes. Note that when delta=0, this corresponds to a stride of 1 unit (2-bytes); and when delta=1 this corresponds to a stride of 2 units (4-bytes), etc. This is because for most applications a stride of zero is not useful. However, it is not excluded that in some alternative implementations, one of the different possible values of the programmable stride gives the option of being able to select a zero stride, i.e. to allow for a static address for one of the two load operations from one instance to the next.

In embodiments the first and second loads are post-incremented by their respective strides. I.e. with each instance of the double-load instruction that is executed, the first, fixed stride of that instance is applied after the first load operation of that instance; and the second, variable stride of the same instance is applied after the second load operation of that instance (though the relative order of the first load relative to the second load, the first stride relative to the second stride, the first stride relative to the second load and the second stride relative to the first load do not necessarily matter). However in other, alternative implementations, it is not excluded that the first and second loads could be pre-incremented by their respective strides when the double-load instruction is executed.

Mathematically the described functionality may be expressed as follows.

```
base_addr = $mBase[20:0]           // read base address from base register
woffset = $mOffset[31:16]          // read weight offset from first field of offset register
doffset = $mOffset[15:0]           // read data offset from second field of offset register
delta = $mDelta[3:0]               // read stride from 4 least-significant bits of delta reg.
EA[0] = base_addr + woffset        // add the weight address offset to the base address
EA[1] = base_addr + doffset        // add the data address offset to the base address
woffset +=2                        // increment the weight address offset by 2 bytes
mdelta = (delta +1)*2              // compute stride in bytes
doffset += mdelta                  // increment the data address offset by the stride
$mOffset := (woffset<<16)|doffset  // write incremented offsets back to offset register
$mDelta := $mDelta >>4             // shift the stride delta right by 4 bit to get next stride
```

The first and second load operations are performed by the load-store unit (LSU) 55 of the execution unit 18 in response to the opcode of the double-load instruction. In embodiments, the computation and application of the strides may also be performed by the LSU; or in other embodiments, some or all of this functionality could be implemented by re-using logic in another unit 58 of the execution unit 18, such as the integer arithmetic logic unit IALU.

It will be appreciated that the above embodiments have been described by way of example only.

For instance the exact semantics given above are not necessarily limiting, and the skilled person may find other ways to encode the same underlying functionality or similar into a single machine code instruction. For instance one or more of the operands may be immediate operands rather than operands that specify their respective information be reference to a value held in a register such as $mBase, $mOffset or $mDelta ("immediate" being a term of the context of an instruction set architecture, meaning the information is specified by being encoded directly as number into the operand field rather than by reference to a register).

Alternatively or additionally, one or more of the operands may not be needed, and the information they would otherwise specify may instead be implicit ("implicit" is a term of art in the context of an instruction set architecture, meaning that the information in question does not need to be specified in an operand since instead it is automatically assumed to be). For instance the identity of the stride register $mDelta could be implicit.

In further variants, more operand fields may be provided, e.g. two destination operand fields may be provided in the instruction allowing the first and second destination registers to be specified independently. Such design considerations may depend, e.g., on the amount of functionality of the intended application, and the instruction bit width of the processor architecture.

In further example variants, the first and second offsets could be absolute addresses rather than relative to a base, i.e. offsets relative to 0 in address space, and hence the base address operand is not needed. Also, the idea of an offset or delta as referred to herein (including where it is described to "add" or "increment" or such like), should not be read as excluding adding a negative value. I.e. equivalently, the magnitude of the offset could be subtracted from the base address, and/or the magnitude of the stride (delta) could be subtracted from the second offset with each instance of the double-load instruction (so as to work backwards through the memory addresses, starting from a higher value and then decreasing to lower values).

Further, note that the architectural bit widths and sizes of the various registers and values described above are not limiting, and again may be different in other implementations depending on design considerations and the intended application of the processor, etc.

Further, the scope of the disclosure is not limited to an application in neural networks or machine learning, and the teachings herein may more generally be employed in any application that needs to load and process some systematic values alongside other selected values from a sparse data set. Also, the scope of the disclosure is not limited to a multi-threaded or multi-tile architecture. The techniques may be used on any design of processor that may be used to load and process both systematic and sparse data.

Other variants or use cases of the disclosed techniques may become apparent to the person skilled in the art once given the disclosure herein. The scope of the disclosure is not limited by the described embodiments but only by the accompanying claims.

What is claimed is:

1. A processor comprising an execution unit, memory and one or more register files, the execution unit being configured to execute instances of machine code instructions from an instruction set, wherein:
   the types of instruction defined in the instruction set include a double-load instruction for loading from the memory to at least one of the one or more register files, the one or more register files including a variable stride register holding one or more memory address stride values; and
   the execution unit is configured to execute the double-load instruction a plurality of times and, each time the double-load instruction is executed, to:
   perform a first load operation to load data from a first address in the memory, and a second load operation to load data from a second address in the memory;
   increment the first address by a fixed stride such that the first address used for the first load operation differs by the fixed stride between the respective execution of the double-load instruction and at least one of a preceding or subsequent execution of the double-load instruction;
   obtain one of the memory address stride values from the variable stride register for use as a variable stride for incrementing the second address; and
   increment the second address by the respective variable stride such that the second address used for the second load operation differs by the respective variable stride between the respective execution of the double-load instruction and at least one of a preceding or subsequent execution of the double-load instruction.

2. The processor of claim 1, wherein:
   the double-load instruction takes operands specifying for each instance of the double-load instruction: a first source address in the memory for the first load operation, a first destination in one of the one or more register files for the first load operation, a second source address in the memory for the second load operation, and a second destination in one of the one or more register files for the second load operation, the first source address being specified by a first offset in an offset register in one of the one or more register files, and the second source address being specified by a second offset in the offset register in one of the one or more register files; and
   the execution unit is configured so as, each time the double-load instruction is executed, to perform the respective first load operation by loading a first value from the first source address to the respective first destination, and apply the fixed stride to the first offset, and to perform the respective second load operation by loading a second value from the second source address to the respective second destination, and apply the variable stride to the second offset.

3. The processor of claim 2, wherein the first and second offsets are held in different fields of the offset register in one of the one or more register files, and the execution unit is configured to apply the strides by adding the fixed and variable strides to the first and second offsets respectively then writing back to the offset register.

4. The processor of claim 3, wherein said offset register is specified by an operand of the double-load instruction.

5. The processor of claim 2, wherein the execution unit is configured so as, each time the double-load instruction is executed, to determine said first source address by adding the first offset to a non-zero base address, and to determine said second source address by adding the second offset to a non-zero base address.

6. The processor of claim 5, wherein the same base address is used for the first and second source addresses.

7. The processor of claim 6, wherein the base address is specified in a base address register in one of the one or more register files.

8. The processor of claim 7, wherein the double-load instruction takes an operand specifying the base address.

9. The processor of claim 1, wherein the double-load instruction takes an operand specifying the variable stride register.

10. The processor of claim 1, wherein the one or more memory address stride values comprise a plurality of memory address stride values, and the execution unit is configured to vary the variable stride by using different ones of the memory address stride values with different instances of the double-load instruction executed by the execution unit.

11. The processor of claim 10, wherein the execution unit is configured to perform said use of different memory address stride values by shifting contents of the variable stride register by one field's worth of bits with each successive instance of the double-load instruction.

12. The processor of claim 1, programmed to execute a program comprising at least part of a neural network, the program comprising a plurality of instances of the double-load instruction; wherein in each instance, the respective first load operation is used to load weights of neural network, and the respective second load operation is used to load data operated upon by the neural network.

13. A computer program embodied on a non-transitory computer-readable storage medium and comprising code configured to be executed by a processor, the code which when executed causes the processor to:
   execute a plurality of times, a double-load instruction for loading from a memory of the processor to a plurality of register files, the plurality of register files including a variable stride register holding one or more memory address stride values;
   wherein each execution of the double-load instruction includes performing a first load operation to load data from a first address in the memory and incrementing the first address by a fixed stride such that the first address used for the first load operation differs by the fixed stride between the respective execution of the double-load instruction and at least one of a preceding or subsequent execution of the double-load instruction; and
   wherein each execution of the double-load instruction further includes: performing a second load operation to load data from a second address in the memory; obtaining one of the memory address stride values from the variable stride register for use as a variable stride for incrementing the second address; and incrementing the second address by the respective variable stride such that the second address used for the second load operation is incremented by the respective variable stride between the respective execution of the double-load instruction and at least one of a preceding or subsequent execution of the double-load instruction.

14. The computer program of claim 13, wherein the double-load instruction takes operands specifying for each instance of the double-load instruction:

a first source address in the memory of the processor for the respective first load operation, a first destination in the plurality of register files for the respective first load operation, a second source address in the memory for the respective second load operation, and a second destination in the plurality of register files for the respective second load operation, the first source address being specified by a first offset in an offset register in the plurality of register files, and the second source address being specified by a second offset in the offset register.

15. The computer program of claim 13, wherein each execution of the double-load instruction further includes performing the respective first load operation by loading a first value from a first source address to a first destination, and applying the fixed stride to a first offset, and performing the respective second load operation by loading a second value from a second source address to a second destination, and applying the variable stride to a second offset.

16. The computer program of claim 13, wherein the one or more memory address stride values comprise a plurality of memory address stride values, and the code causes the processor to vary the variable stride by using different ones of the memory address stride values with different instances of the double-load instruction executed by the processor.

17. A method of operating a processor having an execution unit, memory, and a plurality of register files, the method comprising:

executing a plurality of times, a double-load instruction for loading from the memory of the processor to the plurality of register files, the plurality of register files including a variable stride register holding one or more memory address stride values;

wherein each execution of the double-load instruction includes performing a first load operation to load data from a first address in the memory and incrementing the first address by a fixed stride such that the first address used for the first load operation differs by the fixed stride between the respective execution of the double-load instruction and at least one of a preceding or subsequent execution of the double-load instruction; and wherein each execution of the double-load instruction further includes:

performing a second load operation to load data from a second address in the memory; obtaining one of the memory address stride values from the variable stride register for use as a variable stride for incrementing the second address; and incrementing the second address by the respective variable stride such that the second address used for the second load operation is incremented by the respective variable stride between the respective execution of the double-load instruction and at least one of a preceding or subsequent execution of the double-load instruction.

18. The method of claim 17, wherein the double-load instruction takes operands specifying for each instance of the double-load instruction:

a first source address in the memory of the processor for the respective first load operation, a first destination in the plurality of register files for the respective first load operation, a second source address in the memory for the respective second load operation, and a second destination in the plurality of register files for the respective second load operation, the first source address being specified by a first offset in an offset register in the plurality of register files, and the second source address being specified by a second offset in the offset register.

19. The method of claim 17, wherein each execution of the double-load instruction further includes performing the respective first load operation by loading a first value from a first source address to a first destination, and applying the fixed stride to a first offset, and performing the respective second load operation by loading a second value from a second source address to a second destination, and applying the variable stride to a second offset.

20. The method of claim 17, wherein the one or more memory address stride values comprises a plurality of memory address stride values the method further including varying the variable stride by using different ones of the memory address stride values with different instances of the double-load instruction executed by the processor.

\* \* \* \* \*